United States Patent
Boss et al.

(10) Patent No.: US 8,812,718 B2
(45) Date of Patent: Aug. 19, 2014

(54) SYSTEM AND METHOD OF STREAMING DATA OVER A DISTRIBUTED INFRASTRUCTURE

(71) Applicant: International Business Machines Corporation, Armonk, NY (US)

(72) Inventors: Gregory J. Boss, Saginaw, MI (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/011,102

(22) Filed: Aug. 27, 2013

(65) Prior Publication Data

US 2014/0025838 A1  Jan. 23, 2014

Related U.S. Application Data

(63) Continuation of application No. 11/839,432, filed on Aug. 15, 2007, now abandoned.

(51) Int. Cl.
*G06F 15/16* (2006.01)
(52) U.S. Cl.
USPC ......................................................... 709/231
(58) Field of Classification Search
CPC ............ H04H 60/80; H04L 29/0651–29/0653; H04L 65/4064–65/4092; H04L 65/607–65/68
USPC ................. 709/213–216, 223–226, 230–234; 725/86–104
See application file for complete search history.

(56) References Cited

U.S. PATENT DOCUMENTS

| | | |
|---|---|---|
| 5,835,495 A | 11/1998 | Ferriere |
| 6,415,323 B1 | 7/2002 | McCanne et al. |
| 6,558,049 B1 | 5/2003 | Shin |
| 6,594,798 B1 | 7/2003 | Chou et al. |
| 6,795,858 B1 | 9/2004 | Jain et al. |
| 7,028,096 B1 | 4/2006 | Lee |
| 7,969,997 B1 | 6/2011 | Noh et al. |
| 2001/0034740 A1 | 10/2001 | Kerne |
| 2002/0029282 A1 | 3/2002 | Buddhikot et al. |
| 2002/0035617 A1 | 3/2002 | Lynch et al. |
| 2002/0124098 A1 | 9/2002 | Shaw |
| 2003/0005138 A1 | 1/2003 | Giffin et al. |
| 2003/0007515 A1 | 1/2003 | Apostolopoulos et al. |
| 2003/0012187 A1 | 1/2003 | Avery |
| 2003/0115340 A1 | 6/2003 | Sagula et al. |
| 2003/0120502 A1 | 6/2003 | Robb et al. |

(Continued)

OTHER PUBLICATIONS

Peterson et al., "Computer Networks: A Systems Approach", 2nd ed., 2000, pp. 284-288.

(Continued)

*Primary Examiner* — Brendan Higa
(74) *Attorney, Agent, or Firm* — Lisa Ulrich; Roberts Mlotkowski Safran & Cole, P.C.

(57) ABSTRACT

A system and method of streaming data in real time and, more particularly, a system and method of real time streaming of data over a grid network or other distributed infrastructure. The method and system includes updating a content directory of a root server with end resource information. The method and system further includes processing the end resource information to determine connection locations for streaming data to at least one requesting end resource in a network.

47 Claims, 4 Drawing Sheets

(56) References Cited

U.S. PATENT DOCUMENTS

| | | |
|---|---|---|
| 2003/0217113 A1 | 11/2003 | Katz et al. |
| 2004/0098470 A1 | 5/2004 | Kurihara |
| 2004/0143672 A1 | 7/2004 | Padmanabham et al. |
| 2005/0021758 A1 | 1/2005 | White |
| 2006/0015581 A1 | 1/2006 | Breiter et al. |
| 2007/0237185 A1 | 10/2007 | Pereira et al. |
| 2008/0049720 A1 | 2/2008 | Liu et al. |
| 2008/0133767 A1 | 6/2008 | Birrer et al. |
| 2008/0140853 A1 | 6/2008 | Harrison |
| 2008/0205291 A1 | 8/2008 | Li et al. |
| 2008/0294788 A1 | 11/2008 | Wu et al. |
| 2009/0024754 A1 | 1/2009 | Setton et al. |
| 2009/0164579 A1 | 6/2009 | Chaudhry |

OTHER PUBLICATIONS

Annapureddy et al., "Providing Video-On-Demand Using Peer-to-Peer Networks", Internet Protocol TeleVision (IPI-V) Workshop, May 2006, 14 pages.

Cui et al., "Asynchronous Streaming Multicast in Application-Layer Overlay Networks", IEEE, vol. 22, No. 1, pp. 91-106.

Hamra et al., "A Pull-Based Approach for a VoD Service in P2P Networks", Proc. of 7th IEEE Int'l Conf. on High speed Networks and Multimedia Comm (HSNMC), Jul. 2004, 12 pages.

Hua et al., Video Delivery Technologies for Large-Scale Deployment of Multimedia Applications, Proceedings of the IEEE, Sep. 2004, vol. 92, No. 9, pp. 1439-1451.

Kumar et al., Stochastic Fluid Theory for P2P Streaming Systems, 26th Int'l Conf. on Comp. Comm., May 2007, pp. 919-927.

Jin et al., "Cache and Relay Streaming Media Delivery for Asynchronous Clients", Proceedings of the 4th Int'l Workshop on Networked Group Comm., Oct. 2002, 8 pages.

Li, J., "MutualCast: A Servedness Peer-to-Peer Multiparty Real-time Audio Conferencing System", ICME 2005, pp. 602-605.

Liu et al., "Efficient Substream Encoding for P2P Video on Demand", 16th Packet Video Workshop, Lausanne, 2007, 9 pages.

Zhang et al., "CoolStreaming/DONet: A Data-driven Oveday Network for Peer-to-Peer Live Media Streaming", Proc. IEEE 24th annual Joint Conf. of the IEEE Comp. and Comm. Soc., Mar. 13-17, 2005, vol. 3, pp. 2102-2111.

Li, J., "PeerStreaming: A practical Receiver-Driven Peer-to-Peer Media Streaming System", Technical Report, Microsoft Research MSR-TR-2004-101, Sep. 2004, 8 pages.

SYSTEM AND METHOD OF STREAMING DATA OVER A DISTRIBUTED INFRASTRUCTURE

FIELD OF THE INVENTION

The invention generally relates to a system and method of streaming data in real time across a wide area network and, more particularly, to a system and method of real time streaming of data over a grid network or other distributed infrastructure.

BACKGROUND OF THE INVENTION

Managing multiple separate point-to-point connections from a storage source to an end user or application is very inefficient, as the same piece of information will be sent multiple times simultaneously. Consider the example of a group of people in one office listening to an audio stream from a server somewhere on the Internet, where everyone in the room is listening to the same streaming content, such as a conference call.

In known systems, data is streamed by unicast or point-to-point algorithms such as a TCPIP/IP connection from a centralized location (for example a Real Audio server) or by the use of a multicast. The use of IP multicasting is a method to reduce a huge amount of bandwidth and waste by only sending the data out to a preset collection of multicast nodes. The drawbacks to using multicasting is that the preset number of multicast nodes must be known beforehand and many routers over the public Internet do not understand the multicast protocol. Thus, multicasting is limited to synchronized streams, and foreknowledge of the multicast servers is required.

P2P protocols, through the use of complex hashing algorithms, can pull multiple file segments from separate sources and re-assemble those segments into a file. P2P protocols, however, require that the source file must be intact first, before the audio or video can be viewed. Also, regular TCP/IP can be wasteful of bandwidth, as it requires high utilization from the streaming data server. Also, systems require that the file be re-assembled before playback, and therefore, cannot be streamed. Thus, while the file transfer protocols are much more efficient, they do not allow for multiple streams to be re-assembled real-time and operated upon real-time.

Accordingly, there exists a need in the art to overcome the deficiencies and limitations described hereinabove.

SUMMARY OF THE INVENTION

In a first aspect of the invention a method comprises updating a content directory of a root server with end resource information. The method further includes processing the end resource information to determine connection locations for streaming data to at least one requesting end resource in a network.

In another aspect of the invention, the method comprises updating a content directory of the root directory with information related to a connected end user resource and creating a hierarchy of end user resources as the end user resource is connected with the root server. The method further comprises determining a connection location within the hierarchy of end user resources including the root server for receiving streamed data, the determining being based on information in the content directory.

In yet another aspect of the invention, a system comprising a server having a database contains data associated with one or more end user resources and connection information. At least one of a hardware and software component dynamically creates a data source hierarchy of the end user resources based on the data. The at least one of a hardware and software component provides connection locations to each of the end user resources that request access to the data stream. Each of the end user resources that request access to the data stream becomes part of the data source hierarchy.

In still another aspect of the invention, a computer program product comprises a computer usable medium having readable program code embodied in the medium. The computer program product includes at least one component to: update a content directory of a root server with end resource information; and process the end resource information to determine connection locations for streaming data to at least one requesting end resource in a network.

In a still further aspect of the invention, a method for deploying an application for streaming data over a network, comprises providing a computer infrastructure operable to: dynamically create a data source hierarchy of end user resources based on information associated with the end user resources which are connected to a root server, and provide connection locations to each of the end user resources that request access to a data stream streaming from one or more of the end user resources of the data source hierarchy and/or the root server.

DETAILED DESCRIPTION OF EMBODIMENTS OF THE INVENTION

The invention generally relates to a system and method of streaming data in real time and, more particularly, to a system and method of real time streaming of data over a grid network or other distributed infrastructure. In embodiments, the system and method dynamically creates and maintains a hierarchy of data storage resources within a grid infrastructure to allow for efficient streaming of data to multiple end users and applications simultaneously. The storage resources are dynamically created based on, for example, the type and location of the end users and the applications that are accessing the streamed data, amongst other variables and combinations contemplated by the invention. In embodiments, to dynamically create the data source hierarchy, each end resource that requests access to the data stream becomes part of the stream tree. The system and method of the invention can be implemented using standard unicast protocols such as TCP/IP.

By using the invention, it is possible to reduce the amount of data that needs to flow over a distributed Information Technology (IT) infrastructure without the restrictions of IP multicasting. The system and method of the invention also solves the problem of one-to-many distribution of streaming data using standard unicast algorithms such as simple TCP/IP. In addition, the system and method is configured to allow data streaming from different sources simultaneously which is not "file block" dependent, e.g., streaming audio from one server and video from another. The different data streams can be combined on a local resource, i.e., at the requesting end user. Moreover, the invention is configured to operate upon multiple streams of data in real-time thus effectively managing streaming nodes dynamically across the distributed IT enterprise.

Thus, as further discussed below, the system and method of the invention is configured to, amongst other things:

(i) cache streaming data over disparate data storage devices to reduce overall bandwidth requirements, server utilization, and to increase data transfer rates;

(ii) separate a data stream into multiple parts such that an end resource can retrieve these separate streams from separate sources;

(iii) allow end resources the ability to start, stop, and/or pause data streams without affecting other end users; and (iv) create and manage streaming nodes dynamically across the distributed IT enterprise.

Figure 1:
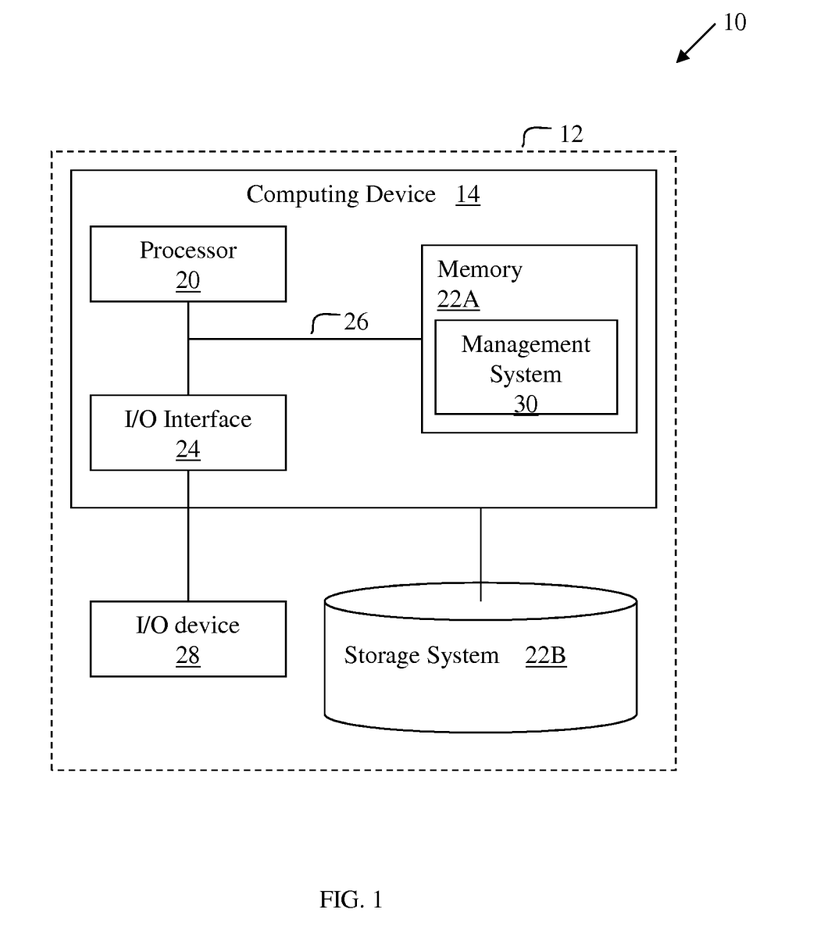
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to dynamically manage real time streaming of data over a grid network or other distributed infrastructure in accordance with the invention, e.g., process described herein. The computing device 14 includes a processor 20, a memory 22A, an input/output (I/O) interface 24, and a bus 26. Further, the computing device 14 is in communication with an external I/O device/resource 28 and a storage system 22B.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. As discussed herein, the management system 30 enables the computer infrastructure 12 to dynamically manage real time streaming of data over a grid network or other distributed infrastructure.

Figure 2:
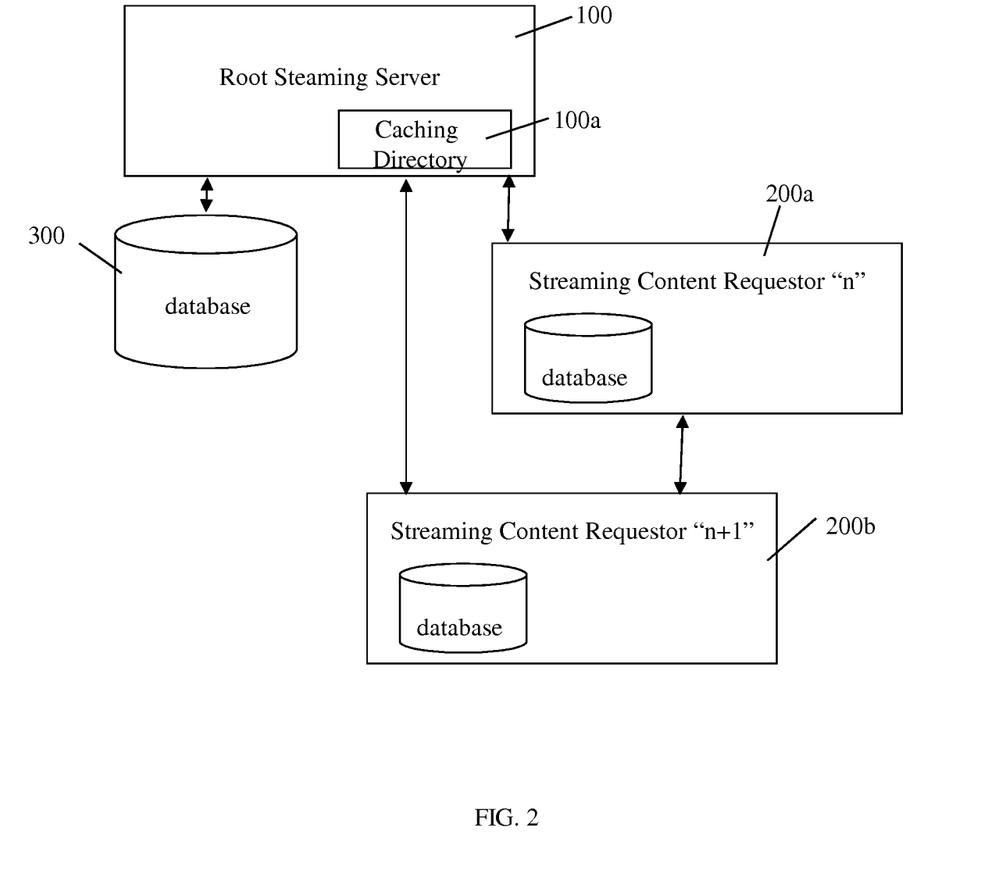
FIG. 2 shows a block diagram of an embodiment in accordance with the invention.

FIG. 2 shows a block diagram of a system in accordance with the present invention. As seen in FIG. 2, the system includes a root server 100 and "n" number of requesting servers 200a, 200b (e.g., end resources). The system is configured to allow the components to transmit and send data to one another via a network. Although only two requesting servers are shown in FIG. 2, it is understood that three or more (e.g., hundreds) requesting servers are also contemplated by the invention.

The root server 100 is designated as the master stream server for broadcasting a stream of content, e.g., a data stream, in real-time. As should be understood, the root server 100 may be implemented in the computer infrastructure of FIG. 1. For example, the root server 100 may be the computing device 14 of FIG. 1.

The root server 100 includes a cache table (content directory) 100a configured to store information associated with the requesting servers 200a, 200b. In this manner, the cache table 100a acts as a content directory, listing the locations of other servers or end resources in the enterprise amongst other information. The caching table (content directory) 100a is dynamically built, in real-time.

As each requesting server is connected to the network, the cache table 100a is updated with information related to the requesting servers 200a, 200b such as, for example, information and/or characteristics of and associated with the requesting servers 200a, 200b. The cache table 100a can be continuously and dynamically updated, in real-time, as each new requesting server is connected to the network or a triggering event occurs. The updated information may include:

(i) listings of the locations of the connected servers and other resources in the enterprise, (ii) the data requested from the requesting server(s), e.g., audio, video, etc., (iii) the bandwidth capabilities of the requesting server(s), (iv) the quality of data which is requested to be received from the root server, and/or (v) the applications that are accessing the streamed data, in addition to a host of other system dependent information.

The triggering event, on the other hand, may be a new connection, a different connection, a stop or pause event of the streaming data, or other event which affects the streaming of the data. The information and triggering event may be transmitted to and used by any of the requesting servers to make a connection determination to either the root server 100 or another end resource.

The root server 100 may stream/broadcast content and other types of data to the requesting servers 200a, 200b via the network. The data transmitted by the root server 100 may be streamed content or the information associated with other requesting servers such as, for example, bandwidth capabilities of the requesting server(s), quality of data which is requested to be received from the root server, in addition to other dependent system information.

The root server 100 is configured to obtain content from a database 300, which is streamed to the end resources such as, for example, the requesting servers 200a, 200b. The database 300 may be external or internal to the root server 100, depending on the configuration of the system. The database 300 is configured to store a specific set of data or content (e.g. audio, video, or any continuous stream, etc.).

The requesting servers 200a, 200b, in embodiments, may be dedicated data storage resources on the grid infrastructure (network) or multiple end user machines running over a network, to name just two different embodiments contemplated by the invention. As further embodiments contemplated by the invention, the requesting servers may be any types of end user machine including, but not limited to, a server, in a client server relationship, a user workstation or a personal computer. In embodiments, the requesting servers 200a, 200b may locally store information associated with other servers, content, etc., as discussed with reference to the cache table 100a. The stored information on the requesting servers 200a, 200b may be used in the same or similar manner as the information stored in the cache table 100a.

The requesting servers 200a, 200b each include a database which stores the requested data, i.e., content stream, and possibly the locations and characteristics of other servers in the enterprise. The databases also buffer a predetermined amount of the content stream, which may be used to (i) provide content to other requesting servers or (ii) ensure that the content stream is not interrupted when a streaming server stops or pauses the streaming data.

In embodiments, each of the requesting servers 200a, 200b may stream content, in real-time, to other requesting servers, upon authentication and authorization. More specifically, in embodiments, the requesting servers 200a, 200b may be dynamically created into a hierarchical set of streaming data resources as the real-time data stream is being broadcast. For example, the server 200a, upon request and authentication of requesting server 200b, may stream data (content) to the requesting server 200b. The streamed data, though, is originated from the root server 200a.

By way of non-limiting illustration, upon the correct authentication and authorization, end resources can request data from the root server 100. As each end resource communicates with the root server 100, the root server 100 will add the address information, amongst other data such as the requested data, broadcast requests (bandwidth, quality), etc. into its cache table 100a. With such information available, the root server 100 will send the information stored in the cache table 100a to the requesting server 200b. Upon receipt of such information, the requesting server 200b can process this information and, upon making a location determination, request that the streaming data be broadcast from the root server 100, another requesting server 200a or a combination thereof. This determination may be based on many different criteria (i.e., information stored in the cache table 100a) including, but not limited to:
  (i) The location to the requesting server 200b to the root server 100 and other requesting server 200a;
  (ii) The type of content requested, e.g., high quality content vs. low quality content, video, audio, etc.; and/or
  (iii) The amount of bandwidth that the resource is willing to use up to receive the data stream, etc.

In this way, the content can be requested from any source dynamically and in real-time during the actual streaming of the data.

Thus, in embodiments, initially there is only one stream server, i.e., the root server 100. However, as multiple new end resources request the same stream of data, the server 100 provides information, from its cache table 100a, to the end resources for making a connection determination to any number of machines. In this manner, the system and method can stream data from different sources simultaneously, resulting in the dynamic creation of a data source hierarchy, where each end resource that requests access to the data stream can become part of the stream tree, e.g., a proxy stream server.

When the end resource receives the data stream, it updates the root cache table 100a with its information, including the delay of the stream it is receiving, which pieces of the stream that it is receiving from which server (e.g., just audio, audio and video, quality, etc. from which server), etc. This allows the cache table 100a to be constantly updated, thus ensuring that the end resources obtain the most updated information when making connection decisions.

In embodiments, the system and method is configured to permit any of the end resource(s) (e.g., requesting servers, 200a, 200b) to obtain different content pieces from multiple sources. By way of non-limiting example, the end resource, e.g., server 200b, may request high quality video data from the root server 100 and audio data from another requesting server, e.g., server 200a. In this process, the end resource, e.g., server 200b, makes a determination, based on an analysis of the information received from the root server 100, as to which type of data it will receive from which particular stream server(s). The stream server may be the root server or other end resource(s) or a combination thereof, for example. In embodiments, the receiving (requesting) end resource can use a plurality of methods including but not limited to ping, bandwidth, hop count, etc. to find the best matching resources.

Once the end resource receives the different pieces of content from different sources, the end resource can locally recombine the data streams into a complete data stream of content, as can be implemented by those of ordinary skill in the art using well-known algorithms. Accordingly, the end resources are capable of reassembling and operating upon multiple streams of data in real-time, whereby the system is thus capable of effectively managing streaming nodes dynamically across the distributed IT enterprise. In this way, the system and method is configured to dynamically create and maintain a hierarchy of disparate data storage resources within the distributed infrastructure to allow data streaming from different sources simultaneously. The streaming data is not "file block" dependent, e.g., streaming audio from one server and video from another.

In further implementations, each requesting server 200a, 200b may act independently of one another. That is, each requesting server 200a, 200b may pause, stop or start the streaming data without affecting other end users. This is further described with reference to FIGS. 3 and 4.

Figure 3:
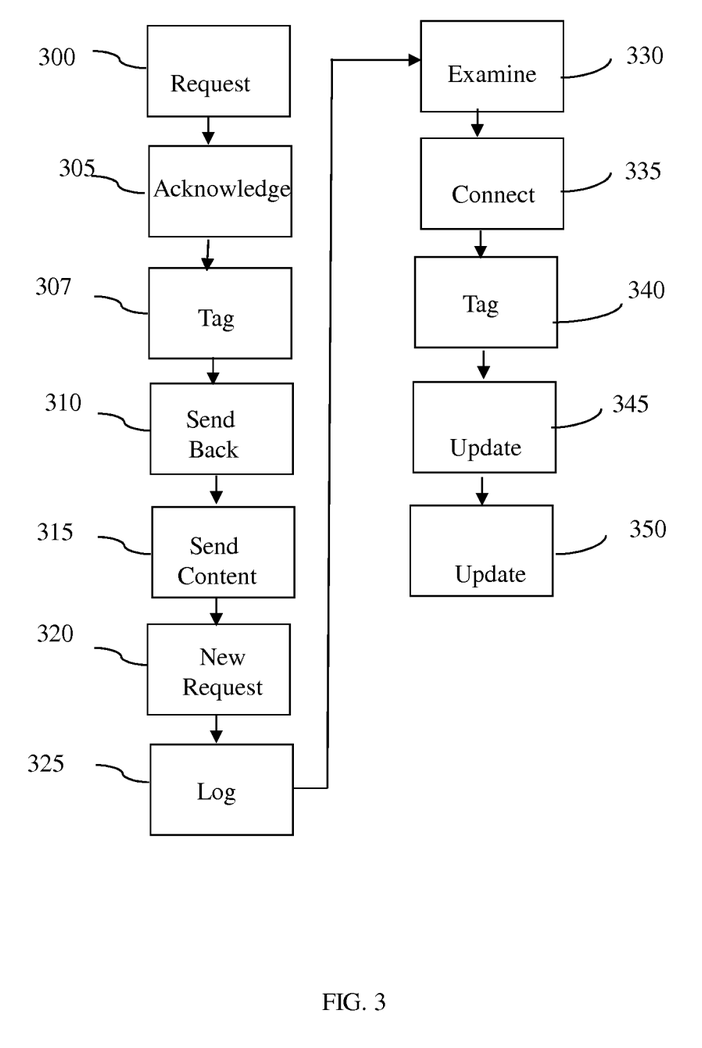
FIG. 3 is a flow chart of steps for implementing aspects of the invention.

FIG. 3 is a flow diagram implementing steps of the invention which may be implemented in the environment of FIG. 1. FIG. 3 (and all other flow diagrams) equally represents a high-level block diagram of the invention. The steps of FIG. 3 (and all other flow diagrams) may be implemented and executed from either a server, in a client server relationship, or they may run on a user workstation with operative information conveyed to the user workstation to dynamically manage real time streaming of data over a grid network or other distributed infrastructure. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 shows an implementation of the processes using, for example, unicasting methodologies. The example of FIG. 3 starts with one streaming server, e.g., root server. This streaming server originally contains the source data to be streamed. In step 300, an end resource, e.g., server 1, requests access to the streaming data source. To accomplish this process, in embodiments, the end resource sends a connection request command (authentication and authorization process) to the root server to request a particular data stream. Included with the connection request may be, for example, information on the level of quality that the end resource wishes to receive and the amount of bandwidth that the resource is willing to use up to receive the data stream.

In step 305, upon acknowledgement of the request, the root server updates the content directory (cache table) for requests to include server 1. In step 307, the root server tags server 1 as a "tier 1" node, i.e., it is one hop away from the root node.

In step 310, the request is sent back to the root server process. In step 315, the root server sends the content to the requestor at the quality level requested by server 1. The root server uses a unicast streaming protocol such as regular TCP/IP. This is synonymous with a regular point to point protocol such as a Real Audio Server streaming to a Real Audio Client.

In step 320, a new end resource request for the same content arrives from a second end user, e.g., server 2. In embodiments, server 2 provides the requirements as to quality and bandwidth restrictions to receive the data stream, similar to that described with reference to server 1. In step 325, the new requestor (server 2) is logged into the content directory (cache table) to determine the possible connection locations for requesting and receiving the requested data stream. In one example, server 2 will receive two locations, e.g., the root server at high quality or server 1 at lower quality and delayed by a number of seconds (since server 1 is one hop away from the root server).

At step 330, server 2 examines the information and makes a connection determination. In this example, server 2 is co-located with server 1 and the available data stream from server 1 meets its requirements. In step 335, server 2 connects to server 1 at which time it can start to receive the data stream. The content directory (cache table) is updated with the connection information.

Although not necessarily in this order, in step 340, server 2 is tagged as a "tier 2" server because it is two hops away from the root server. In step 345, the content directory on the root node is updated to include server 2 as a "tier 2" stream server. Server 2 may also be tagged as tier 1 if it receives information directly from the root server.

In embodiments, the servers can be tagged with various tiers, depending on which piece of the data streamed from a particular source. An example of this embodiment includes the example of the server obtaining high quality data from the root source and low quality data from another requesting server. In this scenario, a tier 1 tag is associated with high quality data and a tier 2 tag is associated with the low quality data. Basically, server 2 is tagged as a "tier 1" server for high quality data because it is one hop away from the root server; whereas, server 2 is tagged as a "tier 2" server for low quality data because it is two hops away from the root server.

As should be understood this same process may continue with more than two end resources, using the steps as described above. By way of example, another end resource (e.g., server 3), may request data from server 1, server 2, the root server or any combination thereof. In this example, server 3 accesses the root server, which will update the content directory (cache table) to include server 3 information. Directory information will be sent to server 3 for processing in order to determine one or more location connections based on the criteria of server 3. By illustration, server 2 requests high quality video data and lower quality audio data.

Based on information received from the root server, server 3 is provided with three possible location connections, e.g., high quality video data from the root server and low quality audio data from either of server 1 or server 2. Making the determination that the high quality video data will be streamed from the root server and the low quality audio data will be streamed from server 2, the root server will tag server 2 as a tier 1 and/or tier 2. In this scenario, as to the audio stream, server 2 will be tagged tier 1 if the audio stream is originating from only the root server. Otherwise, server 2 will be tagged a tier 2 when the audio stream is diverted through server 1. In any scenario, the content directory (cache table) is updated with the connection information.

In step 350, in the event that server 1 becomes unavailable (e.g., stops or pauses), server 2 can connect back to the root server and re-request access to the data stream. In this example, because there is no other servers to stream from, server 2 can upgrade to a tier 1 node and start to receive the data stream directly from the root server. This latter step is further explored in FIG. 4.

Figure 4:
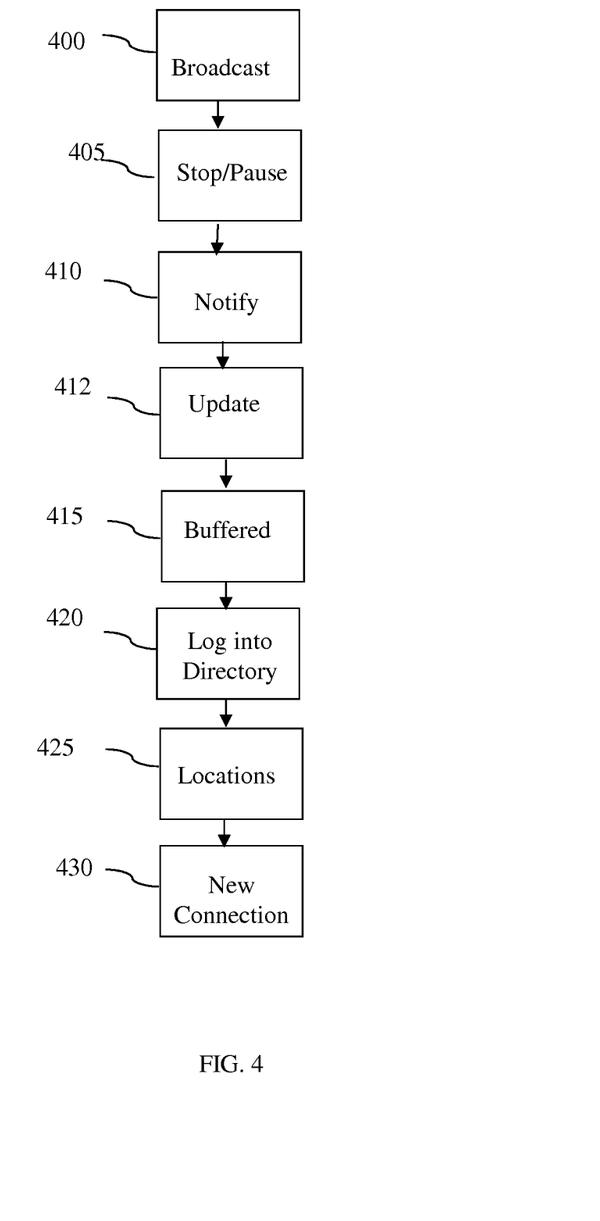
FIG. 4 is a flow chart of steps for implementing aspects of the invention.

FIG. 4 is a flow diagram illustrating a non-limiting example of an aspect of the invention. This example shows that a streaming server can stop or pause the streamed data without affecting other end users. In step 400, the requesting server, e.g., server 1, broadcasts information to the another server, server 2. In step 405, server 1 either stops or pauses the streamed data. In step 410, server 2 is notified or becomes aware that server 1 has stopped or paused the streamed data. The awareness may simply be that sever 2 is no longer receiving streaming data from server 1. In step 412, the cache table is updated with the stop or pause time of server 1.

In step 415, server 2 uses its buffered content to ensure that there is no discernable interruption in the streamed data to the end user. In step 420, server 2, logged into the cache table of the root server, determines other connection locations, noting that the cache table is updated with the stop or pause time information of server 1. In step 425, in one example, server 2 receives additional connection locations which it can receive the streamed data, e.g., the root server or from server 3. In step 430, server 2 will make a connection to a server which provides the streamed data at the particular location of the stop or pause time of server 1 or at any point within the buffered content. This information will be updated into the content directory in step 435.

In embodiments, the invention provides a business method that performs the process steps of the invention on a subscription, advertising, and/or fee basis. That is, a service provider, such as a Solution Integrator, could offer to perform the processes described herein. In this case, the service provider can create, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While the invention has been described in terms of embodiments, those skilled in the art will recognize that the invention can be practiced with modifications and in the spirit and scope of the appended claims.

What is claimed is:

1. A method comprising:
   Updating a content directory of a root directory with information related to a connected end user resource receiving a stream of data in a network, the information associating the end user resource with a location in the network and one or more applications that are accessing the stream of data;
   creating a hierarchy of end user resources as the end user resource is connected with a root server;
   determining a connection location within the hierarchy of end user resources, including the root server, for receiving streaming data from the root server, the determining being based on the information in the content directory;
   tagging each of the connected end user resources in the hierarchy with a value indicating a quality tier of the streamed data available from the respective end user resources, the value of each quality tier being determined based on a number of hops away that each of the connected end user resources is from the root server; and
   updating the content directory with the quality tier of each of the connected end user resources is from the root server,
   wherein at least the step of updating the content directory is performed using a processor of a computer device.

2. The method of claim 1, wherein the hierarchy is dynamically configured as the streamed data is broadcasting in real-time.

3. The method of claim 1, further comprising authenticating the connected end resource.

4. The method of claim 1, wherein the end resource sends a connection request command to the root server to request a particular data stream.

5. The method of claim 4, wherein the connection request includes at least one of information on a level of quality that the end resource wishes to receive and amount of bandwidth that the end resource is willing to use up to receive the streamed data.

6. The method of claim 5, wherein the content directory is updated after authentication of the connected end resource.

7. The method of claim 1, wherein the tagging is based on pieces of content received from the root directory or other end resource.

8. The method of claim 1, wherein the end user resource receives the streamed data directly from the root server and is tagged as a first tier streaming resource and another of the end user resources receives the streamed data from the first tier streaming resource is tagged as a second tier streaming resource.

9. The method of claim 1, wherein each of the end user resources is configured to act independently of one another.

10. The method of claim 1, wherein the content directory is dynamically built, in real-time, as each of the end user resource connects to the root server.

11. The method of claim 1, wherein the information includes information and/or characteristics of and associated with the end user resources, including:
    listings of locations of connected end user resources;
    data requested from the end user resources;
    bandwidth requests and/or bandwidth capabilities of the end user resources;
    quality of data which is requested to be received from the root server;
    delays of the streamed data that the connected end user resources are receiving; and
    listings of pieces of the streamed data that the connected end user resources are receiving from which of the connected end user resources.

12. The method of claim 1, further comprising buffering a predetermined amount of content stream on the end user resources to provide content to other end user resources or to ensure that the content is not interrupted when a streaming server stops or pauses the streamed data.

13. The method of claim 1, wherein the end user resources are two or more end user resources which are dynamically created into a hierarchical set of streaming data resources as the streamed data is broadcast in real-time.

14. The method of claim 13, wherein the streamed data is streamed from the root server, one or more of the end user resources or a combination thereof based on the value of the quality tier of the streamed data available from the respective end user resources.

15. A system comprising:
    a server having a database containing data associated with one or more end user resources and connection information, the data associating the one or more end user resources with a location in a network and one or more applications that are accessing a data stream; and
    at least one of a hardware and software component for dynamically creating a data source hierarchy of the end user resources based on the data, the at least one of a hardware and software component providing connection locations to each of the end user resources that request access to the data stream, wherein each of the end user resources that request access to the data stream becomes part of the data source hierarchy, wherein:
    the at least one of a hardware and software component:
    tags each connected end user resource in the data source hierarchy with a hierarchy level designation indicating a quality tier of the streamed data available from the respective end user resources, the hierarchy level designation of each quality tier being based on a number of hops away that each connected end user resource is from a root server; and
    updates the database with the quality tier of each connected end user resource is from the root server.

16. The system of claim 15, wherein the at least one of a hardware and software component resides on a server provided by a service provider.

17. The system of claim 15, wherein the end user resource receiving the data stream directly from the root server is tagged as a first tier streaming resource and another of the end user resources receiving the data stream from the first tier streaming resource is tagged as a second tier streaming resource.

18. The system of claim 15, wherein:
    each of the end user resources connects to at least one of the connection locations to receive the data stream; and
    each of the end user resources connects to the root server to request access to the data stream when the at least one of the connections locations becomes unavailable.

19. A computer program product comprising a computer readable storage device or memory having readable program code stored in the device or memory, the computer program product includes at least one component to:
- update a content directory of a root server with end resource information of a plurality of end resources receiving a stream of data in a network, the end resource information associating each of the plurality of end resources with a location in the network and one or more applications that are accessing the streaming data;
- process the end resource information by a first end resource included in the plurality of end resources to determine connection locations for accessing the stream of data;
- stream the stream of data by the first end resource from one or more of the connection locations based on one or more types of the applications accessing the stream of data at the first end resource; and
- tag the plurality of end resources with hierarchy level designations indicating a quality of the stream of data available from each of the plurality of end resources.

20. The computer program product of claim 19, wherein the at least one component is further configured to update the content directory each time a new connection is made to the root server or a triggering event occurs.

21. A method, comprising:
- updating a content directory of a root server with end resource information of a plurality of end resources receiving a stream of data in a network, the end resource information associating each of the plurality of end resources with a location in the network and one or more applications that are accessing the streaming data;
- processing the end resource information by a first end resource included in the plurality of end resources to determine connection locations for accessing the stream of data;
- streaming the stream of data by the first end resource from one or more of the connection locations based on one or more types of the applications accessing the stream of data at the first end resource; and
- tagging the plurality of end resources with hierarchy level designations indicating a quality of the stream of data available from each of the plurality of end resources.

22. The method of claim 21, further comprising updating the content directory each time a new connection is made to the root server or a triggering event occurs.

23. The method of claim 21, wherein one of plurality of end resources is a streaming server, responsive to a request by another of the plurality of end resources.

24. The method of claim 23, wherein the streaming server streams the streaming data to the another of the plurality of end resources over the network.

25. The method of claim 23, wherein:
- the streaming server is tagged with a first tag associated with a first tier streaming resource;
- the another of the requesting end resources is tagged with a second tag associated with a second tier streaming resource; and
- the first tag indicates higher quality data than the second tag.

26. The method of claim 23, further comprising updating the content directory with new information concerning the streaming server including at least one of a tag type and a type of data which is streaming to the another of the requesting end resources.

27. The method of claim 21, wherein each of the plurality of end resources is configured to act independently of one another.

28. The method of claim 21, wherein the root server is designated as a master stream server for broadcasting the stream of data in real-time to the first end resource.

29. The method of claim 21, wherein the content directory is dynamically built, in real-time, as the first end resource connects to the root server.

30. The method of claim 21, wherein the end resource information includes information and/or characteristics of and associated with the first end resource.

31. The method of claim 30, wherein the end resource information includes:
- listings of locations of the plurality of end resources;
- data requested from the first end resource;
- bandwidth requests and/or bandwidth capabilities of the first end resource;
- quality of data which is requested to be received from the root server;
- delays of the streaming data that the plurality of end resources are receiving; and
- listings of pieces of the streaming data that the plurality of end resources are receiving from which of the plurality of end resources.

32. The method of claim 31, wherein resource connection information is used by the first end resource to make a connection determination to the root server and/or another end resource.

33. The method of claim 21, wherein the first end resource is at least one of:
- data storage resources on a grid infrastructure, multiple end user machines running over the network, a server, in a client server relationship, a user workstation and a personal computer.

34. The method of claim 21, further comprising buffering a predetermined amount of stream of data on the first end resource to provide content to other of the plurality of end resources or to ensure that the stream of data is not interrupted when a streaming server stops or pauses the stream of data.

35. The method of claim 21, wherein the first end resource is two or more requesting end resources which are dynamically created into a hierarchical set of streaming data resources as the stream of data is broadcast in real-time.

36. The method of claim 21, wherein the root server receives a request from the first end resource and the root server adds address information and broadcast requests of the first end resource into the content directory.

37. The method of claim 36, wherein the stream of data is streamed to the first end resource from the root server, another one of the plurality of end resources or a combination thereof based on the quality of the available stream indicated by the hierarchy level designations of the plurality of end resources.

38. The method of claim 21, wherein initially there is only one streaming server, and as multiple new end resources request the stream of data, the root server provides information to the plurality of end resources for making a connection determination to any number of machines.

39. The method of claim 21, wherein the first end resource obtains pieces of the stream of data from the root server, one or more of the plurality of end resources, or a combination thereof.

40. The method of claim 39, wherein the first end resource locally recombines the pieces into the stream of data.

41. The method of claim 21, further comprising at least one of creating, maintaining and supporting a computer infrastructure that performs the steps of claim 1.

42. The method of claim 21, wherein a service provider, on a subscription, advertising, and/or fee basis, provides the updating and/or processing.

43. The method of claim 21, wherein:
the first end resource connects to the at least one of the connection locations to receive the stream of data; and
the first end resource connects to the root server to request access to the stream of data when the at least one of the connection locations becomes unavailable.

44. The method of claim 21, further comprising updating the content directory of the root server with the end resource information when a triggering event occurs, the triggering event comprising a pause event of the stream of data at the first end resource.

45. The method of claim 44, further comprising:
tagging the first end resource with a tier 1 tag when the first end resource receives the stream of data from the root server; and
tagging the first end resource with a tier 2 tag when the first end resource receives the stream of data from at least one other requesting end resource which receives the streaming data from the root server.

46. The method of claim 45, further comprising processing the end resource information to determine the connection locations for streaming the stream of data to the first end resource in the network when the first end resource which streams the stream of data to the at least one requesting end resource, becomes unavailable for a pause event of the stream of data at the at least one other requesting end resource.

47. The method of claim 21, wherein:
the end resource information includes:
listings of locations of connected requesting end resources;
data requested from the at least one requesting end resource;
bandwidth requests and/or bandwidth capabilities of the at least one requesting end resource;
quality of data which is requested to be received from the root server;
delays of the streaming data that the connected requesting end resources are receiving; and
listings of pieces of the streaming data that the connected requesting end resources are receiving from which of the connected requesting end resources; and
the streaming the stream of data by the first end resource from one or more of the connection locations comprises:
requesting an audio piece of the stream of data from a first of the one or more connection locations based on a first tag associated with the a first of the one or more connection locations; and
requesting a video piece of the stream of data from a second one of the one or more connection locations based on a second tag associated with the a second of the one or more connection locations,
wherein:
the first tag is associated with higher quality data than the second tag, and
one or more of the plurality of end resources are tagged with more than one hierarchy level designation corresponding to different pieces of the stream of data being streamed to other ones of the plurality of end resources.

\* \* \* \* \*